United States Patent [19]

Shimada et al.

[11] Patent Number: 4,823,021

[45] Date of Patent: Apr. 18, 1989

[54] CIRCUIT FOR DETECTING ON/OFF STATES OF SWITCHES

[75] Inventors: Yasuo Shimada; Fumitaka Mouri, both of Tokyo, Japan

[73] Assignee: Kabushiki Kaisha Toshiba, Kawasaki, Japan

[21] Appl. No.: 178,218

[22] Filed: Apr. 6, 1988

[30] Foreign Application Priority Data

Apr. 6, 1987 [JP] Japan .............................. 62-51021[U]

[51] Int. Cl.[4] ...................... H04M 11/00; H01M 7/00

[52] U.S. Cl. ...................................... 307/112; 307/38; 307/117; 307/140; 379/102; 379/84

[58] Field of Search ...................... 307/34, 35, 36, 37, 307/38, 40, 41, 112, 140, 115, 116, 117; 361/173, 174, 175, 176, 177, 86, 90, 91, 92, 3-13; 250/213 R, 213 A, 200, 201, 551, 206; 340/555, 556, 551; 379/102-109, 84, 442

[56] References Cited

U.S. PATENT DOCUMENTS

| | | | |
|---|---|---|---|
| 3,693,060 | 9/1972 | Joyce | 307/117 X |
| 4,267,406 | 5/1981 | Perry | 379/102 |
| 4,384,171 | 5/1983 | Klee | 379/442 X |
| 4,438,527 | 3/1984 | Hammond | 379/102 X |
| 4,723,269 | 2/1988 | Summerlin | 307/140 X |
| 4,751,401 | 6/1988 | Beigel et al. | 307/140 |
| 4,766,330 | 8/1988 | Dreier | 307/140 X |

FOREIGN PATENT DOCUMENTS

| | | |
|---|---|---|
| 53-27470 | 7/1978 | Japan . |
| 62-284477 | 12/1987 | Japan . |
| 62-195803 | 12/1987 | Japan . |

OTHER PUBLICATIONS

Catalog of Mitsubishi Versatile Sequencer, Mitsubishi Electric Corporation, Oct. 1984.

Catalog of SYSMAC C Flowchart Type Programmable Controller, Omron Tateishi Electronics Co., Ltd. Nov. 1984.

*Primary Examiner*—William M. Shoop, Jr.
*Assistant Examiner*—Paul Ip
*Attorney, Agent, or Firm*—Oblon, Fisher, Spivak, McClelland & Maier

[57] ABSTRACT

First and second switches are switches to be detected. An AC signal source supplies AC signals to the switches. A controller includes: one photocoupler for outputting a signal when a supplied current is positive and is equal to or greater than a first current, and when the supplied current is negative and equal to or smaller than a second current; a first diode for receiving an output signal from the AC signal source when the first switch is turned on, and outputting a positive current to the photocoupler; a second diode for receiving an output signal from the AC signal source when the second switch is turned on, and outputting a negative current to the photocoupler; a first latch for latching an output signal from the photocoupler when the AC signal is positive; a second latch for latching output data from the photocoupler when the AC signal is negative; and a CPU. The CPU detects the ON/OFF states of the first and second switches in accordance with output data from the first and second latches, and performs a control operation.

17 Claims, 5 Drawing Sheets

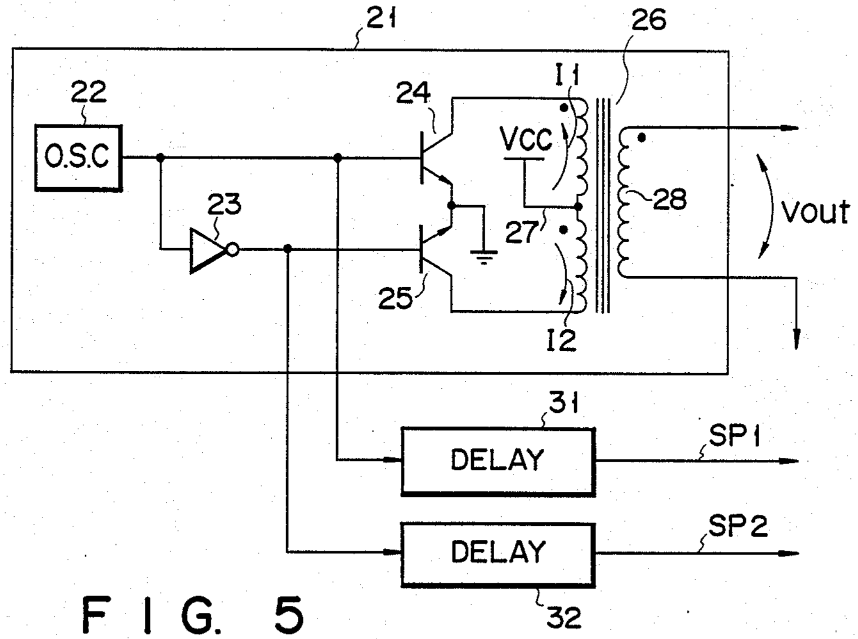
FIG. 5
FIG. 6A
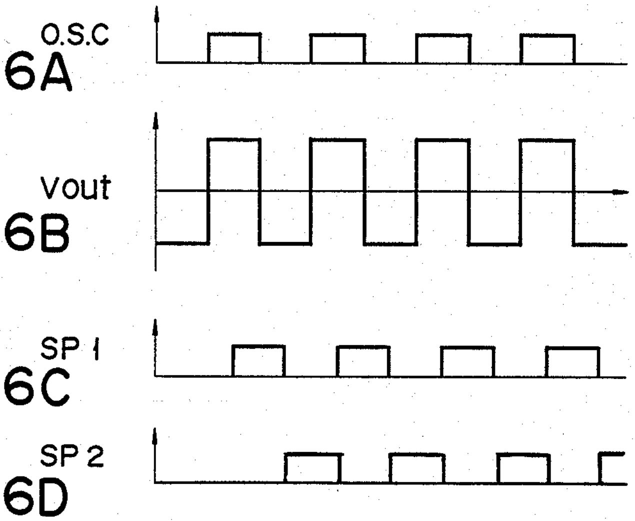
FIG. 6B
FIG. 6C
FIG. 6D

CIRCUIT FOR DETECTING ON/OFF STATES OF SWITCHES

BACKGROUND OF THE INVENTION

1. Field of the Invention

The present invention relates to a circuit for detecting the ON/OFF states of switches in accordance with the presence/absence of AC signals input through the switches.

2. Description of the Related Art

Computer and controllers are used in various fields, e.g., used for controlling of plants, industrial production lines, and machines. In general, the computer and a controller have circuit for detecting the ON/OFF states of the switches. In this case, the switches include, for example, relays, sensors for performing the ON/OFF operations, and various contacts to input set values arranged on a control panel of the controller. Such detection circuits are roughly categorized into DC and AC types. The DC type detection circuit detects the ON/OFF states of the switches using a DC signal source, whereas the AC type detection circuit detects the ON/OFF states of the switches using an AC signal source.

A conventional AC type detection circuit will be described with reference to FIG. 1. Referring to FIG. 1, switches SW1 to SWn are the ones to be detected. Detection circuits Ki are respectively arranged for switches SWi (i=1 to n). Each detection circuit Ki comprises impedance 1 for controlling an input current, rectifier 2 for performing full-wave rectification of an input signal, photocoupler 3, integrating circuit 4, and hysteresis circuit 5.

An operation of a circuit shown in FIG. 1 will be described by exemplifying the operation of switch SW1 and detection circuit K1. When switch SW1 is turned on, an AC voltage is applied from AC signal source (e.g., commercial power source) 9 to input terminal IN1. Voltage e1 applied to input terminal IN1 is rectified by rectifier 2. Output current i1 from rectifier 2 is supplied to photocoupler 3. FIG. 2A shows the relationship between current i1 and voltage e1. When a level of current i1 is higher than ON-current level Ith of photocoupler 3, photocoupler 3 is turned on. When a level of current i1 is lower than ON-current level Ith, photocoupler 3 is turned off. For this reason, as the output voltage from signal source 9 varies, photocoupler 3 is repeatedly turned on and off, as shown in FIG. 2B. An output signal from photocoupler 3 is supplied to integrating circuit 4 and is integrated thereby, as shown in FIG. 2C. When the ON state of switch SW1 is held over a given period of time, and an output voltage from integrating circuit 4 exceeds threshold level Vth, hysteresis circuit 5 outputs high-level signal S1, as shown in FIG. 2D. A CPU (not shown) receives high-level signal S1 and determines that switch SW1 is turned on.

The circuit shown in FIG. 1 has the following drawbacks. (1) The ON and OFF periods of photocoupler 3 vary depending on the magnitude of an output voltage from signal source 9. As a result, the time from when the switch is actually turned on until voltage e2 exceeds threshold level Vth varies in each circuit. Therefore, a complicated adjustment circuit is required for the system. (2) In the circuit in FIG. 1, a detection circuit is required for every switch. For this reason, the number of detection circuits is increased with a corresponding increase in the number of switches to be detected, thereby imposing limitations in the system in terms of packing density, cost, and power consumption.

SUMMARY OF THE INVENTION

It is an object of the present invention to provide a circuit for detecting the ON/OFF states of the switches, which can reliably detect the ON/OFF states of the switches, and is suitable for achieving a high packing density, low cost, and low power consumption.

In order to achieve the above objects, according to the present invention, there is provided a detection circuit for detecting the ON/OFF states of switches, comprising:

two switches to be detected, which are constituted by a first switch (SW1A) and a second switch (SW1B);

an AC signal source (11), connected to the two switches (SW1A, SW1B) to be detected, for outputting an AC signal (VP);

a first rectifier (D1A), connected to the first switch (SW1A), for receiving an output signal from the AC signal source (11) when the first switch (SW1A) is turned on, and outputting a positive component of the output signal;

a second rectifier (D1B), connected to the second switch (SWIB), for receiving an output signal from the AC signal source (11) when the second switch (SW1B) is turned on, and outputting a negative component of the output signal; and a detection circuit (DET1) for determining that the first switch (SW1A) is turned on if the first rectifier (D1A) outputs a positive signal when an output signal from the AC signal source (11) is positive, and for determining that the second switch (SW1B) is turned on if the second rectifier (D1B) outputs a negative signal when the output signal from the AC signal source (11) is negative.

With the above arrangement, in the switch ON/OFF-state detection circuit according to the present invention, one detection circuit is provided to every two switches, and the ON/OFF states of the first and second switches are time-divisionally detected. Consequently, the number of detection circuits can be decreased compared with that of the conventional system. In addition, in this circuit, no complicated system for time-divisional detection is required. Instead, rectifiers are used to satisfy this function. Therefore, the circuit arrangement of the switch ON/OFF-state detection circuit according to the present invention is simpler than that of the conventional detection circuit, and is suitable for achieving a high packing density, low cost, and low power consumption.

BRIEF DESCRIPTION OF THE DRAWINGS

FIG. 5 and FIG. 7 are circuit diagrams showing another embodiments of the present invention; and FIGS. 6A to 6D are timing charts for explaining an operation of the circuit in FIG. 5.

DETAILED DESCRIPTION OF THE PREFERRED EMBODIMENT

Figure 1:
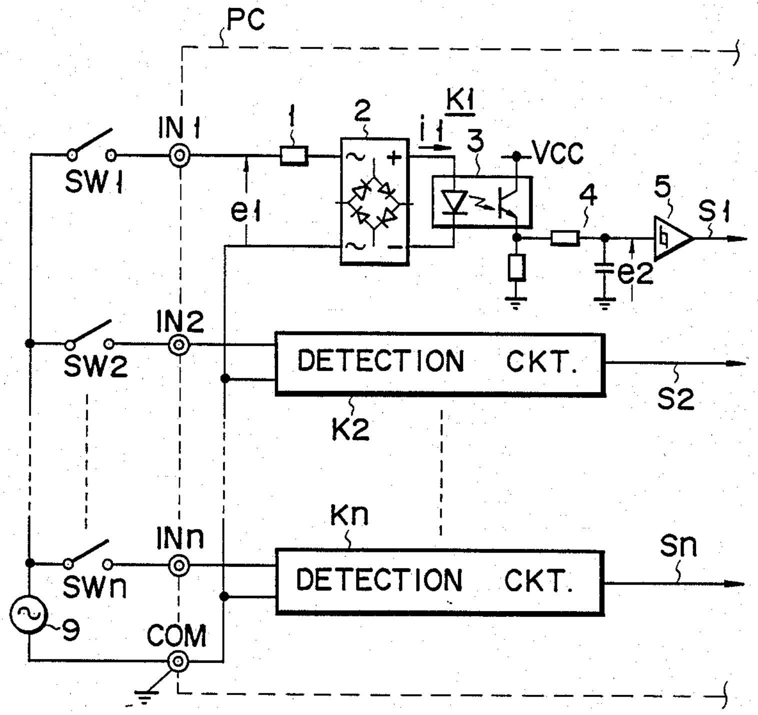
FIG. 1 (PRIOR ART)
FIG. 1 is a circuit diagram showing an arrangement of a conventional circuit for detecting the ON/OFF states of the switches.
Figure 2:
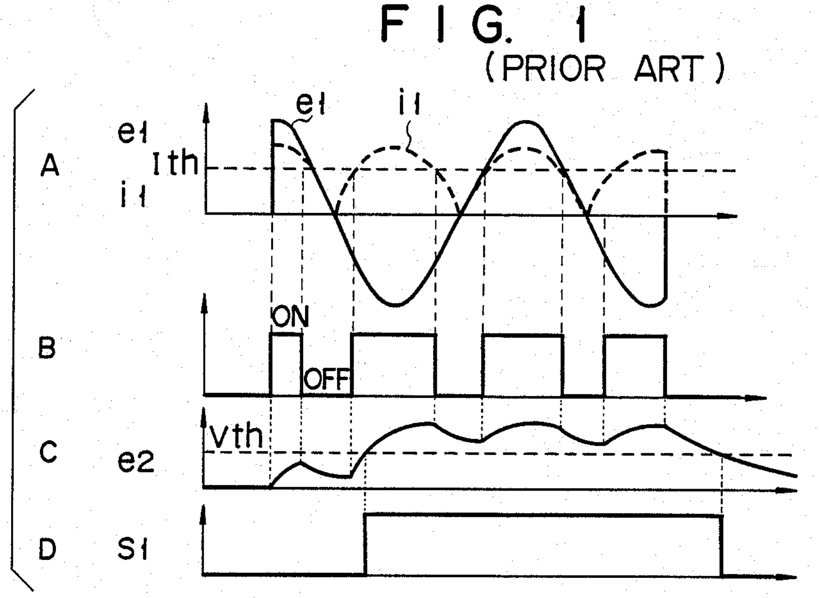
FIG. 2 (PRIOR ART)
FIGS. 2A to 2D are timing charts for explaining an operation of the circuit in FIG. 1.
Figure 3:
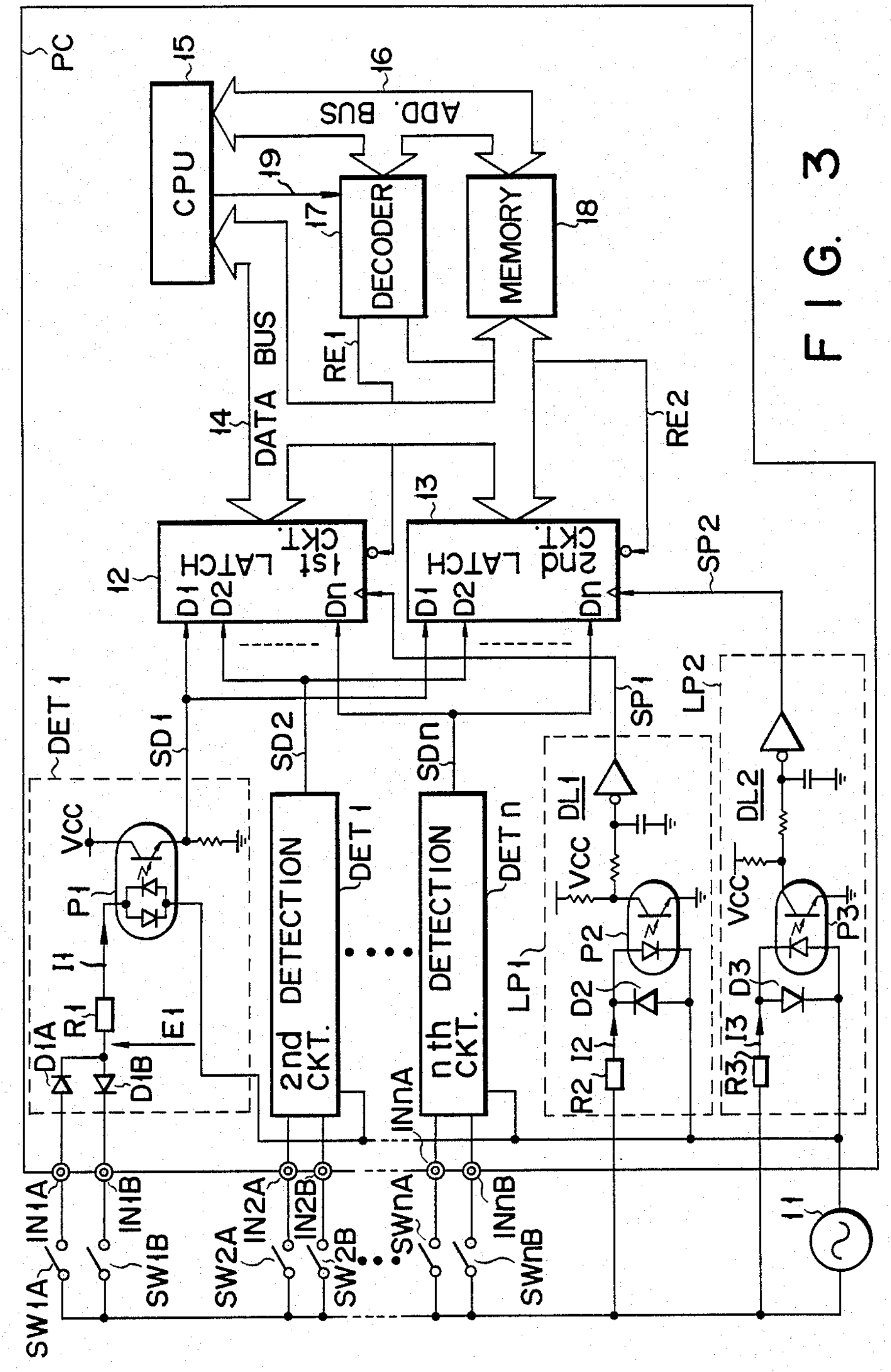
FIG. 3 is a circuit diagram showing an arrangement of a programmable controller comprising circuits for detecting the ON/OFF states of switches according to an embodiment of the present invention.

A system according to an embodiment of the present invention will be described. As shown in FIG. 3, this system comprises 2.n (n is an integer) switches SW1A to SwnA. and SW1B to SWnB to be detected. AC signal source 11, and controller, for example, programmable controller PC for performing a predetermined control operation.

Switches SW1A to SWnA, and SW1B to SWnB constitute pairs. Reference symbol A is suffixed to one switch of a pair, and reference symbol B is suffixed to the other switch of the pair. One terminal of each switch SWiA or SWiB (i is an integer from 1 to n) is connected to one of the output terminals of AC signal source 11. The other terminal of switch SWiA or SWiB is connected to corresponding input terminal INiA or INiB. One detection circuit DETi is connected to the other terminal of each of paired switches SWiA and SWiB through input terminals INiA and INiB.

An output signal from detection circuit DETi is supplied to ith input terminal Di of first latch circuit 12 and ith input terminal Di of second latch circuit 13.

An arrangement of each detection circuit will be described by exemplifying detection circuit DET1. The anode of diode D1A is connected to input terminal IN1A. The cathode of diode D1B is connected to input terminal IN1B. The cathode of diode D1A and the anode of diode D1B are connected to one terminal of input impedance R1 for controlling current I1. The other terminal of input impedance R1 is connected to one input terminal of photocoupler P1. The other input terminal of photocoupler P1 is connected to the other output terminal of AC signal source 11. When input current I1 is positive and equal to or greater than the positive threshold current level (ON current) Ith, and negative and equal to or smaller than negative threshold current level -Ith, photocoupler P1 is turned on, and it outputs a high-level signal. An output signal from photocoupler P1 is supplied to data input terminals Dl of first latch circuit 12 and second latch circuit 13 as an output signal from detection circuit DET1.

Each of detection circuits DET2 to DETn has substantially the same circuit arrangement as that of detection circuit DET1.

Controller PC comprises a first latch pulse output circuit LP1 for outputting latch pulse SP1 to first latch circuit 12, and second latch pulse output circuit LP2 for outputting latch pulse SP2 to second latch circuit 13. First latch pulse output circuit LP1 is connected to AC signal source 11. First latch pulse output circuit LP1 has impedance R2 for controlling current I2. Bypass diode D2 is connected to photocoupler P2 so as to be parallel therewith. When supplied current I2 is positive and equal to or greater than predetermined threshold current Ith, photocoupler P2 is turned on and outputs a low-level signal. Delay circuit DL1 delays the signal output from photocoupler P2 for predetermined time td1, inverts it, and shapes its waveform. An output signal from delay circuit DL1 is supplied to a latch pulse input terminal of first latch circuit 12 as output signal SP1 from first latch pulse output circuit LP1.

Second latch pulse output circuit LP2 is connected to AC signal source 11. Second latch pulse output circuit LP2 has impedance R3 for controlling current I3. Bypass diode D3 is connected to photocoupler P3 so as to be in parallel therewith. When supplied current I3 is negative and equal to or smaller than predetermined threshold current −Ith, photocoupler P3 outputs a low-level signal. Delay circuit DL2 delays an output signal from photocoupler P3 for predetermined time td2, inverts it, and shapes its waveform. An output signal from delay circuit DL2 is supplied to a latch pulse input terminal of second latch circuit 13 as output signal SP2 from second latch pulse output circuit LP2.

Data bus 14 is connected to data output terminals of first and second latch circuits 12 and 13. Data bus 14 is connected to CPU 15. CPU 15 is connected to address bus 16. Address bus 16 is connected to decoder 17 and memory 18. R/W control terminal of CPU 15 is connected to decoder 17. The first output terminal of decoder 17 is connected to the read enable terminal of latch circuit 12. The second output terminal of decoder 17 is connected to the read enable terminal of latch circuit 13.

An operation of the system having the above-described arrangement will be described.

When switch SWiA is turned on, a positive half wave of an output signal from AC signal source 11 renders diode D1A conductive. When switch SWiB is turned on, a negative half wave of an output signal from AC signal source 11 renders diode D2B conductive. Of this reason, when switch SWiA or SWiB is turned on, voltage E1 is generated and current I1 is supplied to photocoupler P1. When current I1, flowing through photocoupler P1, is equal to or greater than current level Ith, or equal to or smaller than current level −Ith, photocoupler P1 is turned on and outputs high-level signal SDi. Therefore, signal SDi output when the output signal from AC signal source 11 is positive indicates the state of switch SWiA. Signal SDi output when the output signal from AC signal source 11 is negative indicates the state of switch SWiB.

Latch pulse output circuit LP1 discriminates the polarity of an input signal using photocoupler P2, and outputs latch pulse SP1 substantially in synchronism with a positive peak of an output signal from signal source 11. Latch pulse output circuit LP2 discriminates the polarity of an input signal using photocoupler P3, and outputs latch pulse SP2 substantially in synchronism with a negative peak of an output signal from signal source 11.

Latch circuits 12 and 13 respectively latch output signals SD1 to SDn from detection circuit DET1 to DETn in synchronism with the positive edge of latch pulses SP1 and SP2. As a result, data representing the ON/OFF state of switch SWiA is held in first latch circuit 12. Data representing the ON/OFF state of switch SWiB is held in second latch circuit 13. The held data are output onto data bus 14 in response to read signals RE1 and RE2.

The above operation will be described in detail with reference to FIGS. 4A to 4H.

Figures 4A, 4B, 4C, 4D, 4E, 4F, 4G, 4H:
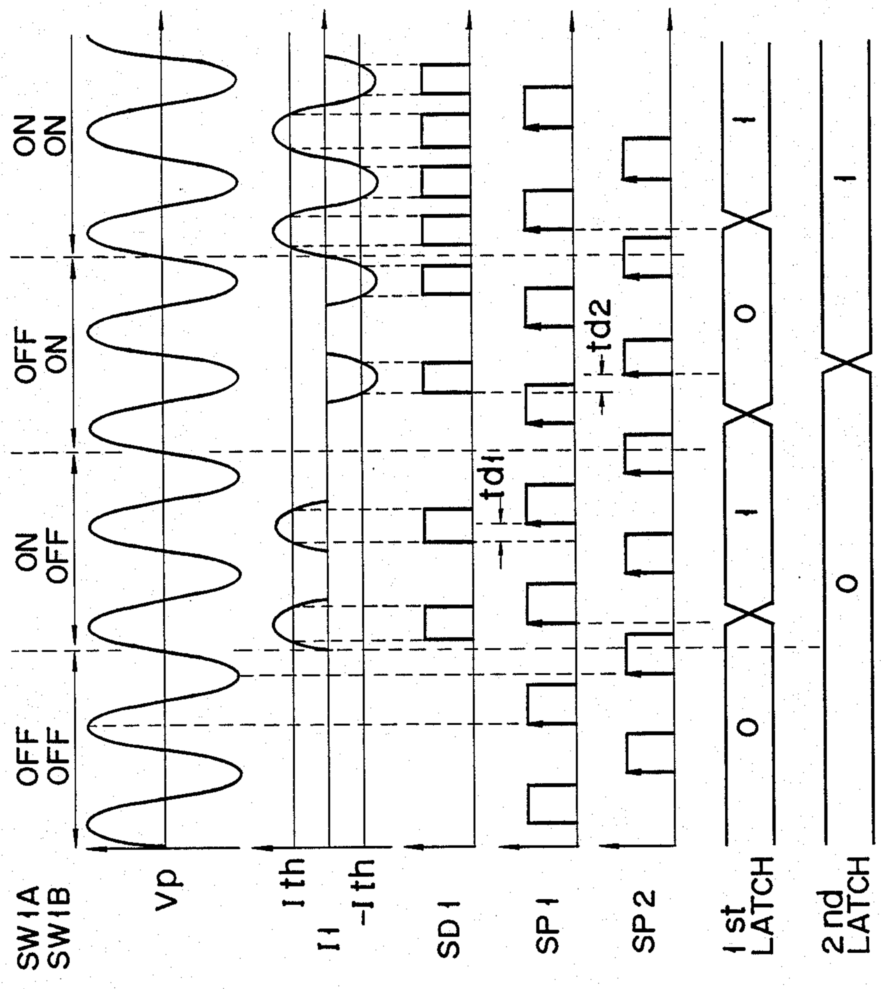
FIGS. 4A to 4H are timing charts for explaining an operation of the circuit in FIG. 3.

Signal source 11 outputs AC voltage VP having a predetermined frequency, as shown in FIG. 4B.

Voltage VP is constantly applied to first latch pulse output circuit LP1. When voltage Vp is negative, current I2 flows through bypass diode D2, and current I2 is not supplied to photocoupler P2. When voltage Vp is positive, current I2 is supplied to photocoupler P2. When current I2, flowing through photocoupler P2, is equal to or greater than threshold level Ith, photocoupler P2 is turned on and outputs a low-level pulse signal.

This pulse signal is delayed by delay circuit DL1 for predetermined time td1, inverted, and its waveform is shaped. Delay time td1 is set in such a manner that a rise time of output pulse SP1, output from delay circuit DL1, coincides with positive peak of voltage VP. First latch pulse output circuit LP1 supplies latch pulse SP1 to first latch circuit 12 at the timing shown in FIG. 4E.

Voltage Vp is also constantly applied to second latch pulse output circuit LP2. When voltage Vp is positive, current I3 flows through bypass diode D3, and current I3 is not supplied to photocoupler P3. When voltage Vp is negative, current I3 is supplied to photocoupler P3. When current I3, flowing through photocoupler P3, is equal to or smaller than threshold level −Ith, photocoupler P3 is turned on and outputs a low-level pulse signal. This pulse signal is delayed by delay circuit DL2 for predetermined time td2. Delay time td2 is set in such a manner that a rise time of an output pulse from delay circuit DL2 substantially coincides with a negative peak of voltage Vp. Second latch pulse output circuit LP2 supplies a latch pulse to second latch circuit 13 at the timing shown in FIG. 4F.

An operation of each detection circuit will be described. In order to facilitate understanding of the description, switches SW1A and SW1B will be exemplified.

(1) As shown in FIG. 4A, switches SW1A and SW1B are in the OFF state:

In this case, voltage E1 is zero and current I1 is zero. Photocoupler P1 is not energized, and signal SD1 is set at a low level, as shown in FIG. 4C. As shown in FIGS. 4G and 4H, first and second latch circuits 12 and 13 latch data "0".

(2) Switch SW1A is in the ON state and switch SW1B is in the OFF state:

In this case, voltage Vp is applied to input terminal IN1A, whereas no voltage is applied to input terminal IN1B. When voltage Vp is positive, diode D1A is rendered conductive, and voltage E1 is generated. As a result, current I1 shown in FIG. 4C is supplied to photocoupler P1. When current I1 is equal to or greater than threshold level Ith, photocoupler P1 is energized and turned on. Then, Photocoupler P1 outputs high-level pulse signal SD1 as shown in FIG. 4D. First latch circuit 12 receives high-level signal SD1, and latches data "1" in response to a rise of pulse SP1, as is shown in FIG. 4G. Signal SD1 is set at a low level when latch pulse SP2 rises. As shown in FIG. 4H, second latch circuit 13 holds data "0".

(3) Switch SW1A is in the OFF state, and Switch SW1B is in the ON state.

In this case, voltage Vp is applied to input terminal IN1B, whereas no voltage is applied to input terminal IN1A. When voltage Vp is negative, diode D1B is rendered conductive, and voltage E1 is generated. As a result, current I1 shown in FIG. 4C is supplied to photocoupler P1. Photocoupler P1 is energized and turned on when current I1 is equal to or smaller than predetermined threshold level −Ith. Then, photocoupler P1 outputs high-level pulse signal SD1 shown in FIG. 4D. First latch circuit 12 receives signal SD1 and latch pulse SP1. Signal SD1 is set at a low level when latch pulse SP1 rises. Then, first latch circuit 12 holds data "0", as shown in FIG. 4G. When latch pulse SP2 rises, signal SD1 is set at a high level. Second latch circuit 13 holds data "1", as shown in FIG. 4H.

(4) Switches SW1A and SW1B are in the ON state.

In this case, voltage Vp is applied to input terminals IN1A and IN1B. When voltage Vp is positive, diode D1A is rendered conductive. When voltage Vp is negative, diode D1B is also rendered conductive. As a result, voltage E1 is generated. As a result, current I1 shown in FIG. 4C is supplied to photocoupler P1. When current I1 is equal to or greater than threshold level Ith, or equal to or smaller than threshold level −Ith, photocoupler P1 is energized. As a result, photocoupler P1 outputs high-level pulse signal SD1 shown in FIG. 4D. When latch pulse SP1 rises, signal SD1 is set at a high level. As shown in FIG. 4G, first latch circuit 12 holds data "1". When latch pulse SP2 rises, signal SD1 is set at a high level. Consequently, second latch circuit 13 latches data "1", as shown in FIG. 4H.

According to the above-described embodiment, when data "1" is stored in first latch circuit 12, corresponding switch SWiA is turned on. When data "0" is stored in first latch circuit 12, corresponding switch SWiA is turned off. Similarly, when data "1" is stored in second latch circuit 13, corresponding switch SWiB is turned on. When data "0" is stored in second latch circuit 13 corresponding switch SWiB is turned off.

When CPU 15 detects the states of switches SWiA, it outputs an address assigned to first latch circuit 12 onto address bus 16, and outputs read control signal 19. Decoder 17 decodes the address and sets read signal RE1 at an active level. In response to read signal RE1, first latch circuit 12 outputs held data onto data bus 14. CPU 15 judges the data and detects the states of the switches. For example, if the data read out from first latch circuit 12 is (MSB)00011111(LSB), it can be determined that first to fifth switches SW5A to SW5A of switches SWiA are in the ON state, whereas sixth to eighth switches SW6A to SW8A are in the OFF state. Similarly, when CPU 15 detects the ON/OFF states of switches SWiB, it outputs an address assigned to second latch circuit 13 onto address bus 16, and control signal 19. Decoder 17 decodes the address and control signal 19, and sets read signal RE2 at an active level: In response to signal RE2, second latch circuit 13 outputs held data onto data bus 14. CPU 15 deciphers the data on data bus 14, and detects the ON/OFF states of switches SWiB.

CPU 15 executes a predetermined control operation in accordance with the determined C;N/OFF states of the switches and a program held in memory 18.

According to the embodiment, detection of the ON/OFF states of switches SWiA and the ON/OFF states of switches SWiB are time-divisionally performed in the periods when output signals from AC signal source 11 are positive and negative, respectively. For this reason, the ON/OFF states of two switches can be detected by one single detection circuit. Therefore, the number of detection circuits can be decreased as compared with that of the conventional system. In addition, the number of parts constituting the system can also be reduced as compared with that of the conventional system. Moreover, since latch circuits 12 and 13 are used, even if AC signal source 11 is used in which the voltage levels are always changed, data representing the ON/OFF states of the switches can be held.

The arrangements of latch pulse output circuits LP1 and LP2 are not limited to those shown in FIG. 3. For example, if capacitive impedances such as capacitors are used as impedances R1 to R3, and the timings for turning on photocouplers P2 and P3 are properly set by setting phases of currents flowing through photocouplers P2 and P3, delay circuits DL1 and DL2 can be omitted. In the embodiment, the rise times of latch pulses SP1 and SP2 are synchronized with a peak time of voltage Vp. This is because the largest margin is obtained, and even if the phases of the signal input through the switches very, output signal SDi from detection circuit DETi can be reliably latched. If signal SDi can be reliably latched, the output timing of latch pulses SP1 and SP2 can be arbitrarily set.

Figure 7:
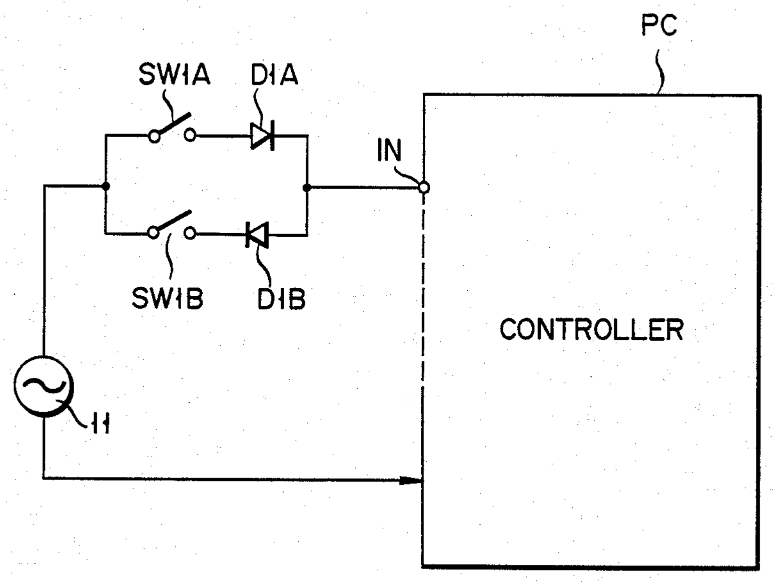

Note that the number of switches to be detected need not be an even number, but may be an odd number. Although in FIG. 3, diodes D1A and D1B are used, other half-wave rectifiers may be used. Diodes D1A and D1B need not be arranged inside programmable controller PC, for example, diodes D1A and D1B may be integrally formed with switches SW1A to SWnA, and SW1B to SWnB, as shown in FIG. 7. When such a configuration is used, the number of input terminals, required in the controller PC, can be reduced.

A commercial power source may be directly used as signal source 11. In addition, programmable controller PC may includes AC signal source 11.

An arrangement of an AC signal source according to another embodiment will be described with reference to FIG. 5, wherein a programmable controller comprises the AC signal source. Referring to FIG. 5, AC signal source 21 comprises oscillator 22, inverter 23 connected to oscillator 22, first transistor 24 for receiving an output signal from oscillator 22 at its base, second transistor 25 for receiving an output signal from inverter 23 at its base, and transformer 26 connected to first and second transistors 24 and 25. The emitters of transistors 24 and 25 are connected to the ground potential. The collectors of transistors 24 and 25 are connected to the primary winding of transformer 26. The primary winding of transformer 26 includes center tap 27. Center tap 27 is connected to power source voltage VCC. As shown in FIG. 3, one terminal of secondary winding 28 of transformer 26 is connected to switch SWiA or SWiB, or the like, whereas the other terminal thereof is connected to detection circuits or the like.

An operation of AC signal source 21 will be described with reference to FIGS. 6A to 6B. Oscillator 22 outputs a signal shown in FIG. 6A. Inverter 23 inverts the output signal from oscillator 22. Transistors 24 and 25 are alternately turned on upon the reception of output signals from oscillator 22 and inverter 23. For this reason, currents I1 and I2 which flow in opposite directions are conveyed from center tap 27 through the primary winding. AC voltage Vout appears at the secondary winding, as shown in FIG. 6B.

If AC signal source 21 shown in FIG. 5 is used, AC signals need not be supplied from an external signal source to the switches to be detected. In addition, when the programmable controller is operated by a DC power source, AC signals can be supplied to the switches.

When AC signal source 21 shown in FIG. 5 is used, latch pulses SP1 and SP2 can be generated, by only delaying the output signals from oscillator 22 and inverter 23 by a $\frac{1}{4}$ period using delay circuits 31 and 32. Therefore, the arrangement of controller PC can be considerably simplified.

The present invention is not limited to the above-described embodiments, but various changes and modifications may be made within the spirit and scope of the invention.

What is claimed is:

1. A switch state detection circuit for detecting the ON/OFF states of switches in accordance with the presence/absence of AC signals input through said switches, comprising:

an AC signal source for outputting an AC signal;

a first switch one terminal of which is connected to said AC signal source;

a second switch one terminal of which is connected to said AC signal source;

photocoupler means energized for outputting a signal having a predetermined signal level when a supplied current is positive and equal to or greater than a first current, and when the supplied current is negative and equal to or smaller than a second current;

first rectifying means, connected to said first switch, for supplying the current corresponding to a positive component of the output signal from said AC signal source to said photocoupler means when said first switch is turned on;

second rectifying means, connected to said second switch, for supplying the current which corresponds to negative component of the output signal from said AC a signal source to said photocoupler means when said second switch is turned on;

first latch pulse output means, connected to said AC signal source, for latching a first latch pulse when the output signal from AC signal source is positive and has a predetermined phase;

second latch pulse output means, connected to said AC signal source, for outputting a second latch pulse when the output signal from said AC signal source is negative and has a predetermined phase;

first latch means, connected to said photocoupler means and said first latch pulse output means, for latching the output signal from said photocoupler means in response to the first latch pulse; and second latch means, connected to said photocoupler means and said second latch pulse output means, for latching output data from said photocoupler means in response to the second latch pulse.

2. A circuit according to claim 1, comprising a plurality of assemblies, each of which is constituted by said first and second switches, said first and second rectifying means; and said one photocoupler means, said AC signal source being connected to all of said first and second switches which constitute said plurality of assemblies, and said first and second latch means latching a plurality of output signals from said photocoupler means.

3. A circuit according to claim 1, wherein said first latch pulse output means outputs the first latch pulse to be substantially synchronized with each of the positive peaks of the output signal from said AC signal source, and said second latch pulse output means outputs the second latch pulse to be substantially synchronized with each of the negative peaks of the output signal from said AC signal source.

4. A circuit according to claim 1, wherein said first latch pulse output means comprises means for outputting a first pulse signal when signal level of the output signal from said AC signal source is positive and is equal to or greater than a predetermined threshold signal level, and delay means for delaying the first pulse signal for a predetermined period of time, and said second latch pulse output means comprises means for outputting a second pulse signal when the signal level of the output signal from said AC signal source is negative and is equal to or smaller than a predetermined threshold signal level, and delay means for delaying the second pulse signal for a predetermined period of time.

5. A circuit according to claim 1, wherein said AC signal source comprises means for outputting a clock signal, transformer means, and means, connected to said clock signal output means and said transformer means, for causing currents which flow in opposite directions to flow through a primary winding of said transformer means in response to the clock signal, said first latch pulse output means comprises means for outputting the clock signal with a predetermined delay time, and said second latch pulse output means comprises means for outputting the lock signal with a predetermined delay time.

6. A circuit according to claim 1, wherein said first rectifying means comprises a first diode, an anode of which is connected to said first switch, and a cathode of which is connected to said photocoupler means, and said second rectifying means comprises a second diode, a cathode of which is connected to said second switch, and an anode of which is connected to said photocoupler means.

7. A circuit according to claim 1, further comprising:

data bus connected to said first and second latch means;

central processing unit means, connected to said data bus means, for performing a predetermined control operation in accordance with a program; and read means, connected to said central processing unit means, for causing data held in said first and second latch means to be output to said data bus, in response to a command from said central processing unit means, said central processing unit detecting the ON/OFF states of said first and second switches in accordance with output data from said first and second latch means.

8. A switch state detection circuit for detecting ON/OFF states of switches, comprising:

two switches to be detected, comprising first and second switches;

an AC signal source, connected to said two switches to be detected, for outputting an AC signal;

first rectifying means, connected to said first switch, for receiving an output signal from said AC signal source when said first switch is turned on and outputting a positive component of the output signal;

second rectifying means, connected to said second switch, for outputting a negative component of an output signal from said signal source when said second switch is turned on; and detection means for detecting that said first switch is turned on if said first rectifying means outputs a positive signal when an output signal from said signal source is positive, and for detecting that said second switch is turned on if said second rectifying means outputs a negative signal when an output signal from said AC signal source is negative.

9. A circuit according to claim 8, wherein said detection means comprises:

photocoupler means, connected to said first and second rectifying means, for outputting a signal having a predetermined signal level when a supplied current is positive and equal to or greater than a first current, and when the supplied current is negative and equal to or smaller than a second current;

first latch pulse output means, connected to said AC signal source, for outputting a first latch pulse when an output signal from said AC signal source is positive and has a predetermined phase;

second latch pulse output means, connected to said AC signal source, for outputting a second latch pulse when the output signal from said AC signal source is negative and has a predetermined phase;

first latch means, connected to said photocoupler and said first latch pulse output means, for latching the output signal from said photocoupler means; and second latch means, connected to said photocoupler means and said second latch pulse output means, for latching output data from said second photocoupler means in response to the second latch pulse.

10. A circuit according to claim 9, wherein said first latch pulse output means outputs the first latch pulse to be substantially synchronized with a positive peak time of the output signal from said AC signal source, and said second latch pulse output means outputs the second latch pulse to be substantially synchronized with a negative peak time of the output signal from said AC signal source.

11. A circuit according to claim 9, wherein said AC signal source comprises means for outputting a clock signal; transformer means; and means, connected to said clock signal output means and said transformer means, for alternately causing currents which flow in opposite directions to flow through a primary winding of said transformer means in response to the clock signal, said first latch pulse output means comprises means for outputting the clock signal with a predetermined delay time, and said second latch pulse output means comprises means for outputting the clock signal with a predetermined delay time.

12. A circuit according to claim 8, wherein said first rectifying means comprises a first diode, an anode of which is connected to said first switch, and a cathode of which is connected to said photocoupler means, and said second rectifying means comprises a second diode, a cathode of which is connected to said second switch, and an anode of which is connected to said photocoupler means.

13. A circuit according to claim 9, further comprising:

data bus means connected to said first and second latch means;

central processing unit means, connected to said data bus means, for performing a predetermined control operation in accordance with a program; and read means, connected to said central processing unit means, for causing data held in said first and second latch means to be output to said data bus means in response to a command from said central processing unit means;

said central processing unit means detecting ON/OFF states of said first and second switches in accordance with output data from said first and second latch means.

14. A switch state detection system comprising:

two switches to be detected, comprising first and second switches;

an AC signal source connected to said two switches;

first rectifying means, connected to said first switch, for receiving an output signal from said AC signal source when said first switch is turned on and outputting a positive component of the output signal;

second rectifying means, connected to said second switch, for receiving the output signal from said AC signal source when said second switch is turned on and outputting a negative component of an output signal from said signal source;

photocoupler means adapted to receive output signals from said first and second rectifying means and energized to output a signal having a predetermined signal level when a current of the received signal is positive and equal to or greater than a first current, and when the current is negative and equal to or smaller than a second current;

first latch pulse output means for outputting a first latch pulse when the output signal from the AC signal source is positive and has a predetermined phase;

second latch pulse output means for outputting a second latch pulse when the output signal from said AC signal source is negative and has a predetermined phase;

first latch means, connected to said photocoupler means and said first latch pulse output means, for latching the output signal from said photocoupler means in response to the first latch pulse;

second latch means, connected to said photocoupler means and said second latch pulse output means, for latching output data from said photocoupler means in response to the second latch pulse;

data bus means connected to said first and second latch means;

central processing unit means connected to said data bus means; and read means, connected to said central processing unit means, for causing data held in said first and second latch means to be output to said data bus means in response to a command from said central processing unit means;

said central processing unit means the detecting ON/-OFF states of said first and second switches in accordance with output data from said first and second latch means.

15. A circuit according to claim 14, wherein said first rectifying means comprises a first diode, an anode of which is connected to said first switch, and a cathode of which is connected to said photocoupler means, and said second rectifying means comprises a second diode, a cathode of which is connected to said second switch, and an anode of which is connected to said photocoupler means.

16. A circuit according to claim 14, wherein said first and second rectifying means, said photocoupler means, said first and second latch pulse output means, said first and second latch means, said data bus means, said central processing unit means and said read means are provided in a case and constitute a controller for performing any desired control operation.

17. A circuit according to claim 14, wherein said photocoupler means, said first and second latch pulse output means, said first and second latch means, said data bus means, said central processing unit means and said read means are provided in a case and constitute a controller for performing any desired control operation.

* * * * *